United States Patent
Sawaf (10) Patent No.: US 10,891,673 B1
(45) Date of Patent: Jan. 12, 2021

(54) SEMANTIC MODELING FOR SEARCH

(71) Applicant: A9.com, Inc., Palo Alto, CA (US)

(72) Inventor: Hassan Sawaf, Los Gatos, CA (US)

(73) Assignee: A9.com, Inc., Palo Alto, CA (US)

( * ) Notice: Subject to any disclaimer, the term of this patent is extended or adjusted under 35 U.S.C. 154(b) by 700 days.

(21) Appl. No.: 15/388,943

(22) Filed: Dec. 22, 2016

(51) Int. Cl.
| | | |
|---|---|---|
| *G06F 17/30* | (2006.01) | |
| *G06Q 30/06* | (2012.01) | |
| *G06N 3/08* | (2006.01) | |
| *G06F 16/248* | (2019.01) | |
| *G06F 16/2455* | (2019.01) | |

(52) U.S. Cl.
CPC ....... *G06Q 30/0625* (2013.01); *G06F 16/248* (2019.01); *G06F 16/2455* (2019.01); *G06N 3/08* (2013.01); *G06Q 30/0643* (2013.01)

(58) Field of Classification Search
CPC .............. G06Q 30/0625; G06Q 30/00; G06F 16/3347; G06F 16/2455; G06F 16/248; G06N 3/08
See application file for complete search history.

(56) References Cited

U.S. PATENT DOCUMENTS

| | | | | |
|---|---|---|---|---|
| 6,269,368 | B1 * | 7/2001 | Diamond | G06F 16/3329 |
| 8,533,054 | B1 * | 9/2013 | Haney | G06Q 30/06 |
| | | | | 705/26.1 |
| 2004/0006556 | A1 * | 1/2004 | Kwoh | G06Q 30/02 |
| 2015/0293976 | A1 * | 10/2015 | Guo | G06F 16/248 |
| | | | | 707/706 |
| 2017/0177712 | A1 * | 6/2017 | Kopru | G06F 17/289 |
| 2017/0372398 | A1 * | 12/2017 | Kopru | G06Q 30/0627 |
| 2018/0052928 | A1 * | 2/2018 | Liu | G06N 3/0454 |

OTHER PUBLICATIONS https://arxiv.org/pdf/1604.06838.pdf.
https://ep2016.europython.eu/media/conference/slides/query-embeddings.pdf.
http://people.cs.pitt.edu/~hashemi/papers/QRUMS2016_HBHashemi.pdf.
https://goo.gl/uFy48j.
https://goo.gl/9czQ9T.
https://goo.gl/OrSg7l.
https://goo.gl/8mxYCI.
https://goo.gl/cgPN6z.
https://goo.gl/BdtlN0.
https://goo.gl/TThdfL.
https://goo.gl/BfG29h.
https://goo.gl/C7Fvsx.

* cited by examiner

*Primary Examiner* — Usmaan Saeed
*Assistant Examiner* — William P Bartlett
(74) *Attorney, Agent, or Firm* — Hogan Lovells US LLP (57) ABSTRACT

A semantic analysis can be performed to determine an intent of a received query. The intent can relate to a primary object of the query, which can be identified through the semantic analysis. Other attributes can be determined from the query that help to focus the object of the intent. A query vector is generated, based on the intent and primary object, and used to search a multi-dimensional semantic space including semantic representations of possible matches. The attributes are used to adjust the query vector in the semantic space. Objects having vectors ending proximate the query vector are identified as potential search results, with the distance from the query vector being used as a ranking mechanism. If refinement is needed, a dialog is used to obtain additional information from the user. Once results are obtained with sufficient confidence, results can be returned as search results for the query.

17 Claims, 9 Drawing Sheets

SEMANTIC MODELING FOR SEARCH

BACKGROUND

Users are increasingly consuming content electronically, such as by accessing digital content provided over the Internet or another such network. Users often rely upon search queries or keyword strings that can be used to identify potentially relevant content. In many instances, however, the relevance depends upon the words of the actual query that was submitted, as well as the way in which the potentially relevant content is categorized or identified. Conventional search mechanisms are unable to account for the intent of the user who submitted the query, such that the results are not as accurate or relevant as would otherwise be possible.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing content in an electronic environment. In particular, various embodiments perform a semantic analysis of a received query, or other navigational request or instruction, in order to determine an intent of the submitter. The intent can relate to a primary object of the query, which can be identified as a backbone for the intent based upon the semantic analysis. Various other attributes can be determined from the query that help to focus the object of the intent. A query vector can be generated based on the intent and primary object and used to search a multi-dimensional semantic space including semantic representations of possible matches. The attributes can be used to adjust the query vector in the semantic space. Objects having vectors ending proximate the query vector can be identified as potential search results, with the distance from the query vector being used as a ranking mechanism. If refinement is needed, a dialog can be used to obtain additional information or attributes from the user. Once results are obtained with sufficient confidence, at least a subset of those results can be returned as search results for the query.

Various other functions can be implemented within the various embodiments as well as discussed and suggested elsewhere herein.

Figure 1A:
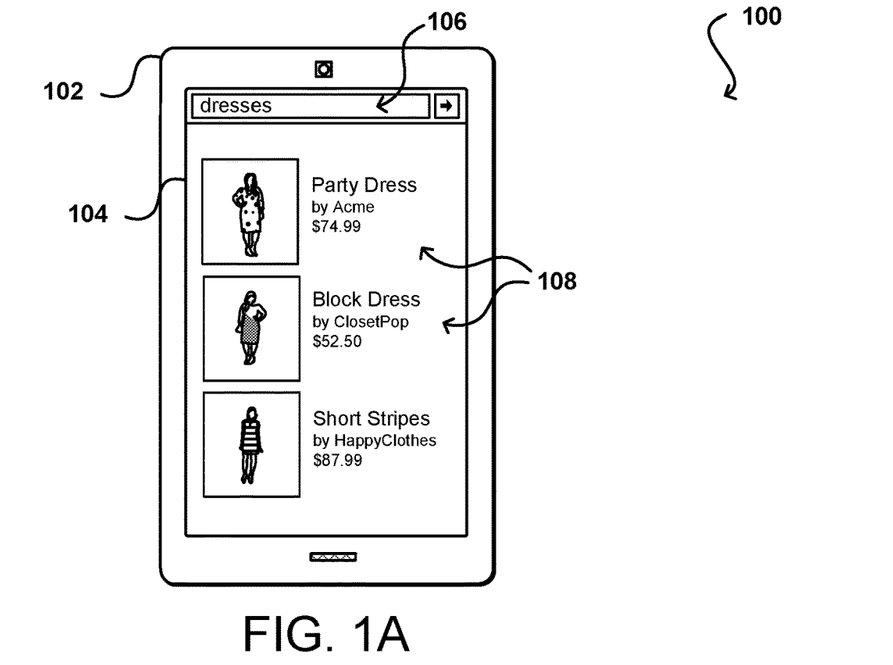
FIGS. 1A and 1B illustrate example displays of search results that can be presented in accordance with various embodiments.

FIG. 1A illustrates an example display of content 100 on a display screen 104 of a computing device 102. In this example a search query 106 has been received and a set of search results 108 determined and returned for presentation in response to the request. Conventional methods for locating search results in response to a query are well known in the art and as such will not be discussed herein in detail. In this example the user has submitted a query including the keyword "dresses" and the returned search results have been determined to be relevant in some way to the keyword. This can be due to a categorization of the results, keywords associated with the results, or tags applied to the result, among other such options. The user can scroll or otherwise navigate through the results to determine whether any of the results are of interest to the user.

Figure 1B:
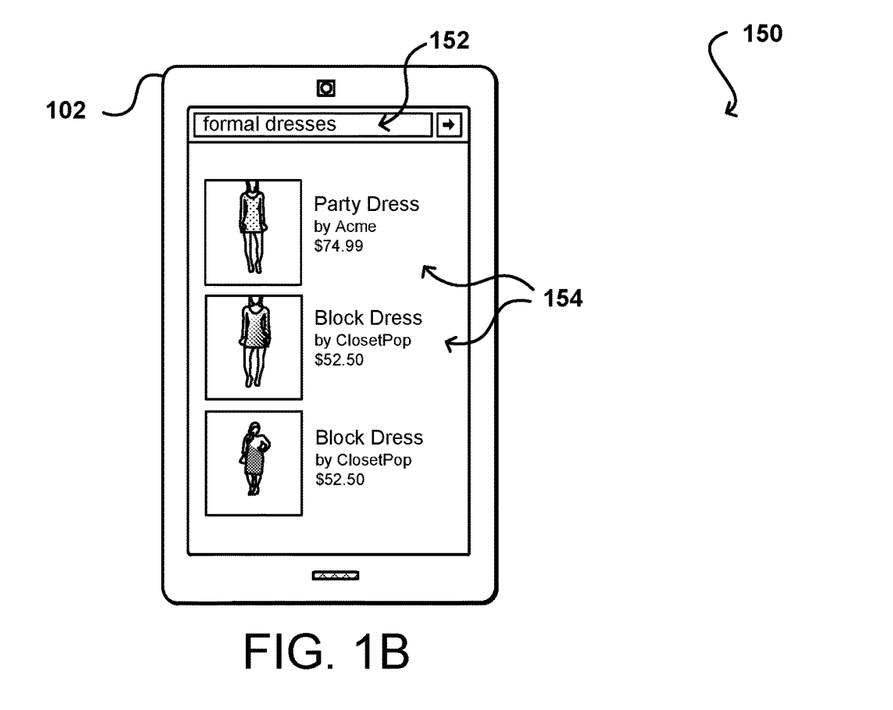

It might be the case that there were too many results returned and the user is not finding items of interest in an initial subset of the results. Accordingly, the user might want to narrow the query in order to obtain search results that are more relevant or of interest to the user based on the user's current interest. For example, FIG. 1B illustrates an updated set of search results 154 returned for a new query 152 that specifies "formal dresses." Similarly, if the user would like a different type of dress the user might want to modify the query in some way. For example, if the user had originally submitted a query such as "cocktail dresses" but is instead interested in results that are less formal, the user would need to submit a query that describes a different type of dress, such as summer dresses.

There are various downsides to such approaches. The user might have a very clear idea in her mind as to the type of results she wants to obtain, but may not know exactly how to describe the results using a limited set of keywords. For example, the user might be looking for a dress for a wedding along the beach in the summer that matches her style and will be appropriate for the season and time of day. While this intent might be clear in the mind of the user, the user may not know how to best specify such a query, or know which types of information are needed to specify such an intent. Accordingly, the user might present a query that includes only a few basic keywords, which can cause results to be obtained that mostly do not correspond to the user's intent.

Figure 2:
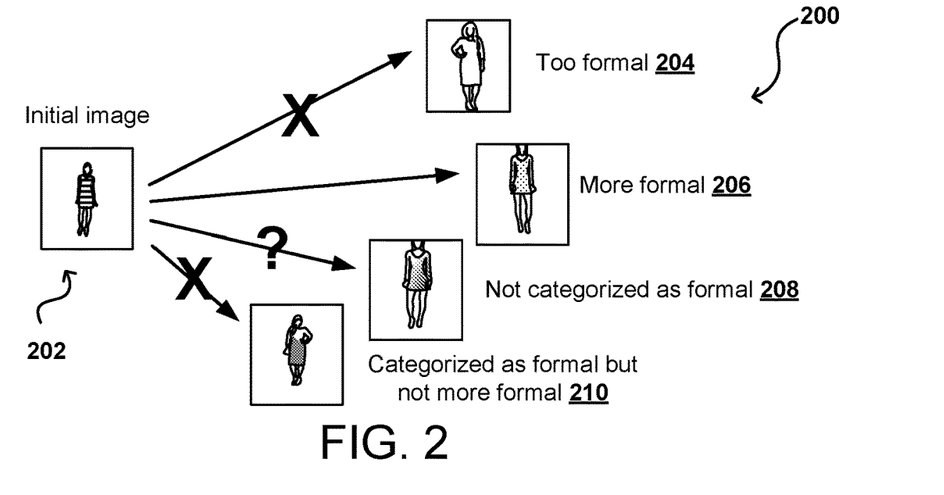
FIG. 2 illustrates example results that may or may not be located using keyword-based refinements alone in various embodiments.

FIG. 2 illustrates an example situation 200 wherein a search result 202 has been located that is close to the item of interest, or at least has some aspects or attributes that are of interest to the user. If the user had included the term "formal" with the query, the search results generally would have included only dresses that are specifically indicated to be "formal" dresses, and there would be no relative point of view from which those dresses would be more formal. For example, a cocktail dress might be formal for certain occasions but not formal enough for a wedding, etc. Example results might have included content for an item 204 that is too formal for the user, based on the user's subjective style or intent. The search results may also include content for an item 206 that is more formal, but potentially not by the amount the user wants or that exhibits other attributes in which the user is not interested. A third result 208 that might be of interest to the user may or may not be returned if the item is not classified or tagged as being "formal" and might only appear if that item was determined to be relevant based on the other keywords of the query. There also can be content for another result 210 returned that is classified as being formal, but at least in the mind of the user is not more formal than the initial search result 202 that was of interest to the user. Thus, it can be difficult using traditional keyword, query, and navigational approaches to refine search results (or other presentations of content) along such visual attributes.

Conventional search approaches still rely primarily on keywords, or concrete words that hold all information necessary to understand the nature of an item or object. The term "asset" will be used herein to refer to concrete items to be indexed, with which a user can interact. Examples of assets include items that have a corresponding product identifier, digital goods such as available videos and music, and event transient elements such as live video and/or audio streams. For one or more keywords received with a search query, a normalization procedure can be executed to allow for variations of that word as may relate to different spellings, corrections, synonyms, machine translations, and the like. Scores for the various possible results, such as indexed documents, can be generated based upon factors such as the term frequency (TF). For each document, the frequency of appearance of a keyword in the query can be determined. This can include, for a keyword "life," the number of times the word life appeared in the document. A distance between the query and one of the assets can then be calculated using such a term-based metric. For example, an inverse document frequency (IDF) for a given keyword can be calculated according to the following, where there are three documents and one includes the keyword:

$$IDF(keyword)=1+\log_e(\#does/\#docswithkeyword)=1+\log_e(3/1)=2.09$$

The product (TF*IDF) of the term frequency (TF) and the inverse document frequency (IDF) can then be calculated for various terms. The query can then be compared against the documents, such as by looking at the relative TF*IDF scores. In some situations boosting can be used for sub-metrics such as CTR, as may be learned from the user behavior on a site or with respect to certain instances of content.

As mentioned, there can be various deficiencies to such an approach. For instance, such an approach may only look for the occurrence of specific words, and not attempt to determine whether the concept associated with that keyword is actually an important or dominant concept in the potential result. Further, the approach does not aggregate or consider similar words or concepts that might actually correspond to the intent of the user. For example, an article about weddings might only have the word "wedding" in the title, but may have words like "ceremony," "nuptials," "bridal party," "best man," and the like, all throughout the document. This would then potentially be ranked lower than a document that talked about financial planning and listed the word "wedding" two or three times in the conversation but otherwise had nothing to do with weddings. If it could be determined that the intent of the user is to locate results primarily related to weddings, and the primary intents of the various documents can be determined as well, then the returned results can be much more relevant to the user based upon the user's subjective intent. Using current search approaches, a user would have to enter additional keywords to hope to find more relevant results. The specific keywords chosen, however, will impact the results returned even if the general concept or intent is the same. While some approaches allow for synonyms and other relations, the approaches still do not address the primary intent, or intents, of the user in submitting the query.

Accordingly, approaches in accordance with various embodiments can attempt to transpose user queries and intents, as well as the various assets, into a searchable semantic space. The semantic space can be agnostic to aspects such as modality, language, and channel, and can allow for the addition of interactivity and communication between the system and the end user. The transposing in at least some embodiments can be performed using deep learning or other machine learning approaches. In at least some embodiments utilizing deep neural networks, each term can be represented as a vector or other semantic construct. Other approaches, such as may include latent semantic indexing or other such abstractions, can be utilized for building the semantic space as well.

There can be various advantages to building and utilizing a semantic space as discussed herein, as learning from any potential source can allow for simple and robust modeling of world knowledge for semantic relationships. For a set of assets, as may be contained in a database, electronic catalog, or other such repository, each asset can be analyzed and indexed according to various semantic values. An attempt can be made to determine a primary concept for each asset and use that as a backbone for representing everything else. For example, if an asset relates to a red dress for a wedding, semantic modeling can be used to determine that the concept "dress" is the backbone for the asset, and terms such as "red" and "wedding" provide various attributes or context describing the dress, or backbone.

Figure 3:
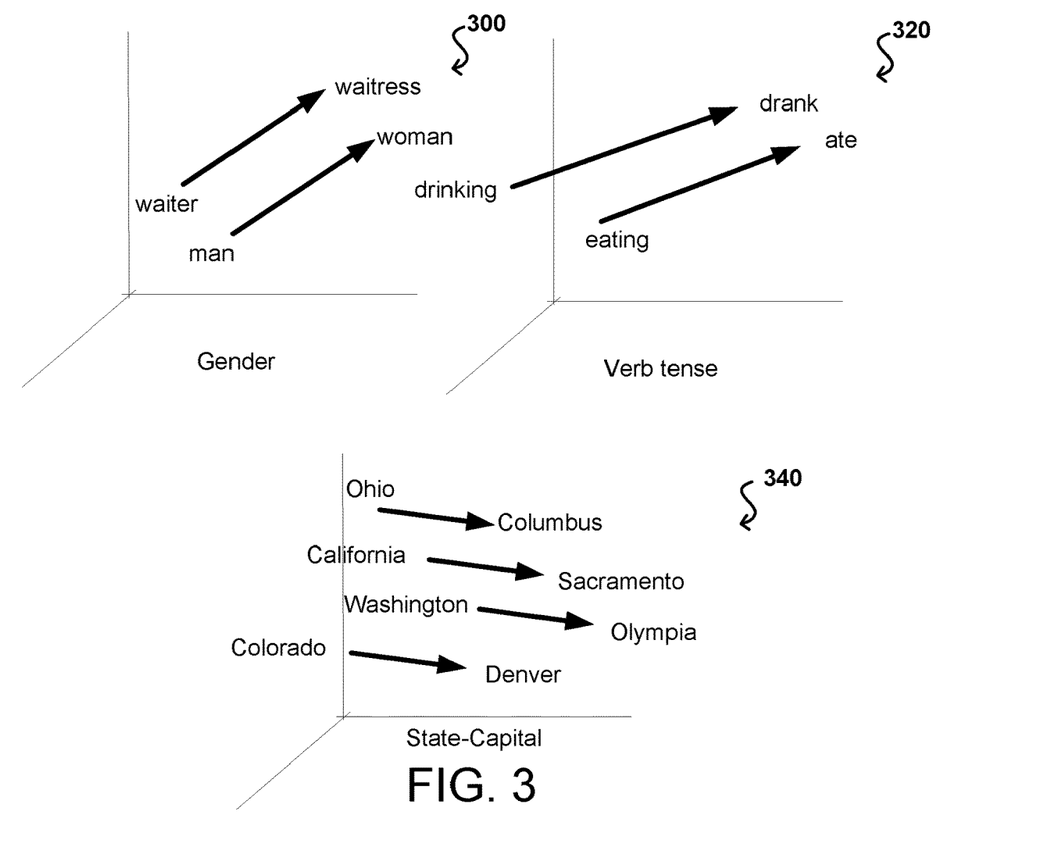
FIG. 3 illustrates semantic relationships that can be learned and leveraged in accordance with various embodiments.

FIG. 3 illustrates examples 300, 320, 340 of relationships that can be learned in semantic space in accordance with various embodiments. Although textual information is presented for purposes of discussion, the analysis can include visual objects or assets as well as discussed in more detail elsewhere herein. In a first example 300, for discussion, various words or concepts are mapped out according to gender. The relationships or vectors between words in the semantic space can be learned using deep learning, and can help to determine relationships between similar words or concepts. For example, if the relationship vector between the terms man and woman is learned in that space for the gender attribute, then a similar vector can be used to determine similar relationships for other words. For example, the same vector could be used to identify relationships between terms such as "boy" and "girl," as well as "waiter" and "waitress" and other gender-based relationships. Further, such semantic space enables other terms to be used to help determine the intent of the query. As mentioned, while in some instances the intent will be explicitly provided through the query, or determined by the application used to submit the query, in other instances the intent can be implicit or implied, and thus can be determined through a semantic analysis or other such approach as discussed and suggested herein. For example, if a query is received that is looking for shoes for a waiter to wear to work, the site being searched may not classify the assets by job, such that few matches may come up for "waiter" shoes. If, from the semantic space, it can be determined that the shoes are shoes for men, based on the proximity of man and waiter in the semantic space, then it can be determined at least that the intent is to find men's shoes, such that relevant results can be obtained. Other words or concepts associated with the term "waiter" along other dimensions can also be used to help determine the intent. In some embodiments a query that simply includes the term "shoes" might be determined to have the intent "buy," while a query that includes the term "podcast" might imply the intent of "listen," among other such options. In some embodiments where an intent is inferred, the user might be prompted to confirm the intent or other information obtained to increase the confidence or accuracy of the determination.

Various other types of semantic relationships can be learned and/or determined from such a semantic space. For example, a plot 320 or verb tense relationships shows how different forms of a word can be determined by examining similar relationships known for other words. Thus, the first example 300 showed that words can be related by attribute, such as gender, while words can also be related by tense or form as in the second example 320. Further, in the semantic space it can be determined that terms such as "drank" and "ate" are in similar locations, such that the proximity of these terms in semantic space can be used to help determine intent for an asset that includes either concept, or both. Other relationships can be learned as well that may be based upon various other types of attributes or aspects. For example, a third example 340 in FIG. 3 illustrates relationships between states and their capital cities. This can be used to determine similar relationships for other cities and states, and also can be used to determine cities that may be similarity located in semantic space due to being state capitals, etc.

Figure 4:
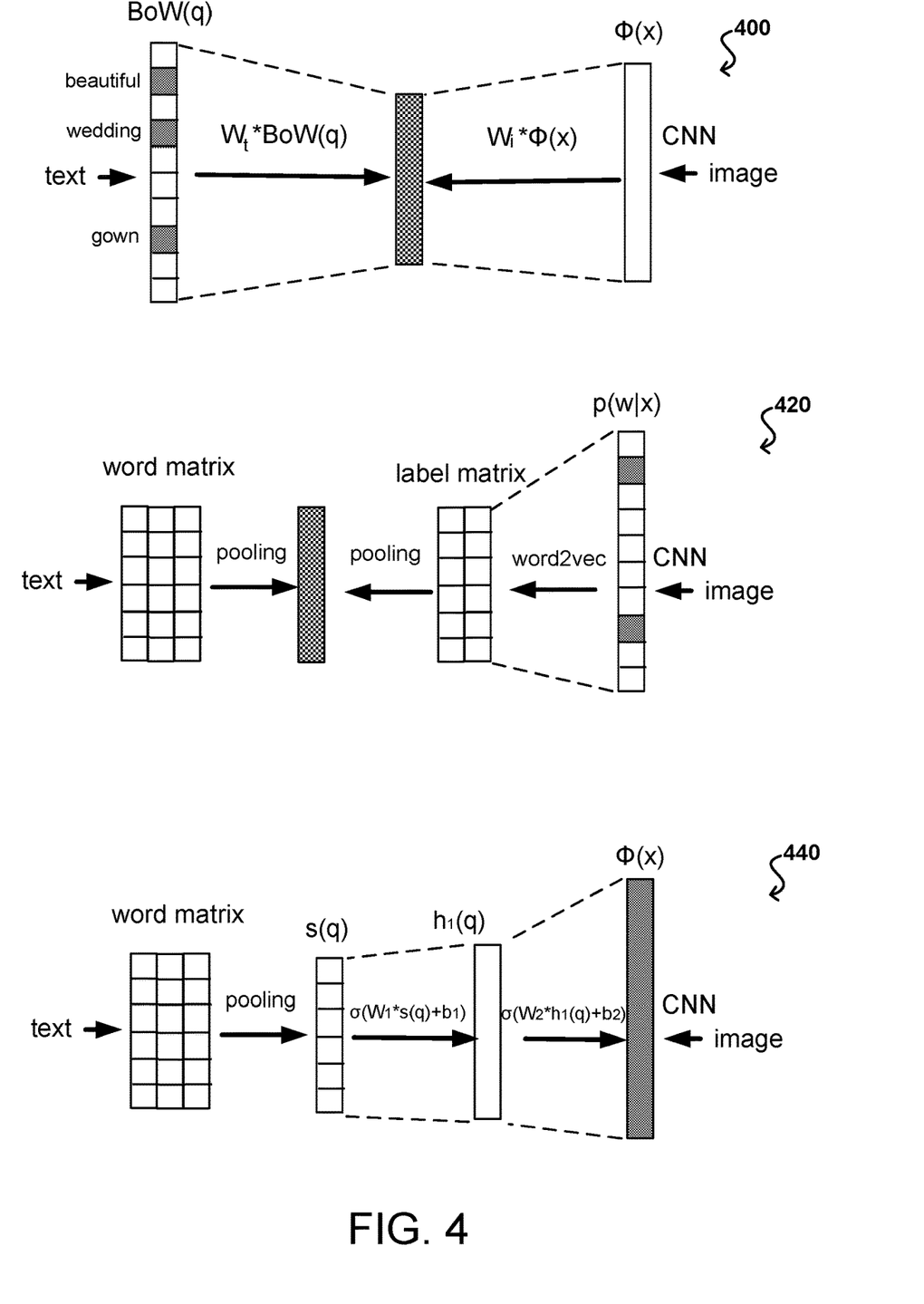
FIG. 4 illustrates example semantic indexing approaches that can be utilized in accordance with various embodiments.

As mentioned, such relationships and semantic vectors or representations can be determined for visual assets as well as textual assets. As examples, FIG. 4 illustrates various text embedding models that can be used for cross-media similarity computation in accordance with various embodiments. In each representation, a shaded bar layer corresponds to the common space of the individual models. Such models allow for learning an intermediate representation or predicting visual deep convolutional neural network (CNN) features from the text, among other such options. The first example 400 of FIG. 4 illustrates polynomial semantic indexing, which uses a learned subspace as a common space. A query can be represented by a bag of words vector and an image represented by a low-level visual feature vector, which enables projection matrices to embed the query and the image into the space of lower dimensionality. The second example 420 illustrates a Word2Vec-based approach, where Word2Vec relates to a set of models (or trained neural networks) that can be used to produce word embeddings. An approach that can be utilized in accordance with various embodiments instead utilizes a Word2VisualVec that is built on top of a Word2Vec model. The Word2VisualVec model inherits the ability to handle a large vocabulary but also embeds text into a visual space instead of an intermediate subspace. This is illustrated by the common space of the models being at the right edge in the third example 440.

Such an approach can allow for cross-media relevance to be determined according to a visual feature space. The cross-media relevance between a given document or text asset and a specific unlabeled image can thus be directly computed in the visual feature space. Further, the parallel training of visual objects and textual information strengthens abstraction power for both use cases. The identification of intent and classification of objects and attributes can run in the same network in either case.

Approaches in accordance with various embodiments can provide various other advantages over conventional approaches. For example, an interactive approach can be provided wherein additional information can be obtained once the backbone or intent has been determined. For a given type of overall intent, or backbone, the questions asked of the user to specify or focus the query or intent can adjust accordingly. Once the intent of the user in submitting the query is determined, that query can be represented in a semantic representation that enables more accurate searching. As mentioned, an advantage of using a semantic query versus a conventional keyword query is that the semantic query provides a sentence structure where the relationships or dependencies of various terms are defined, such that the primary object of relevance is readily determinable. The relevance thus can be more accurately determined than when the keywords of a query are considered as a bank of words of equal weight and importance.

Additional advantages can be obtained when the data used to determine intent and semantic queries, and then utilize those semantic queries for searching, utilizes a data source that includes relevant information for each item, object, or element to be searched. For example, in an electronic marketplace the items to be searched may be products or other offerings (services, digital content, etc.) for which there are various attributes and relationships defined, and where there is a temporal aspect to at least some of these attributes and relationships. For example, there can be different versions of an item offered over time. Initially there might be only one version of an item, such that the determination may be relatively straightforward, but as additional versions are released the determination becomes more complex. There can be various items that go in and out of style over time, or items that are more popular at certain times than others. For example, a "tree" search around the holidays might have different intent, on average, than a search for trees in the planting season. Similarly, different types of clothing will be popular in the summer than in the winter. For food items, there may be specific seasons when those items are popular, and the quality of those food items might vary as it gets later in those seasons. The types of sporting items sold can vary by sporting season as well. For television shows, the presence of an actor or location may change over time, or only exist for a certain portion or subset of the shows. Further, there can be temporal aspects associated with a user as well. For example, the clothing styles that are appropriate for a person may change as that person ages, such as a user going from a toddler to a teenager and eventually to an adult. The types of products or subject that appeal to a person can change over time as well. There can be various other temporal aspects that can be considered within the scope of the various embodiments. Thus, the items, objects, and elements can be indexed with one or more appropriate temporal components as well. In some embodiments there can be multiple index entries for the same item with different time components, such that the appropriate component can be called or referenced over time.

Figure 5:
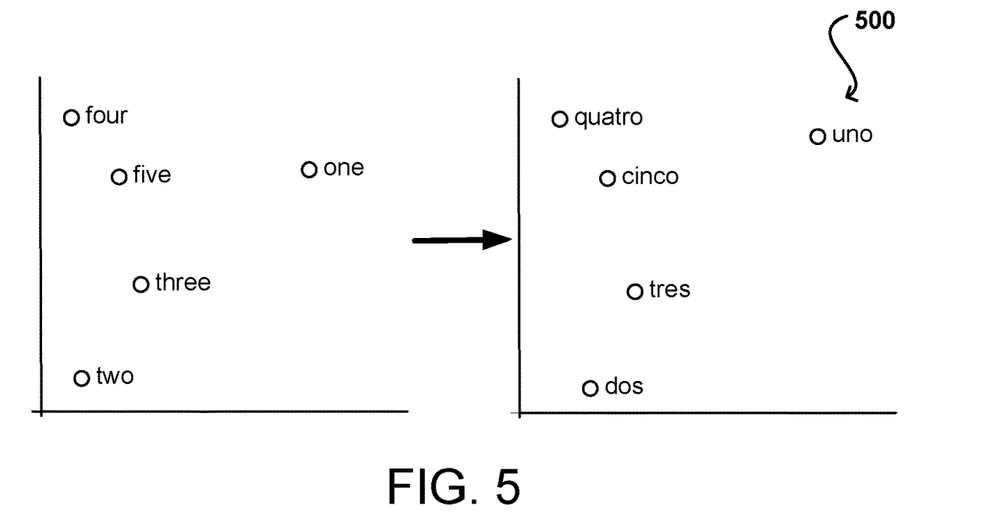
FIG. 5 illustrates an example of semantic similarities that can be learned in accordance with various embodiments.
Figure 6:
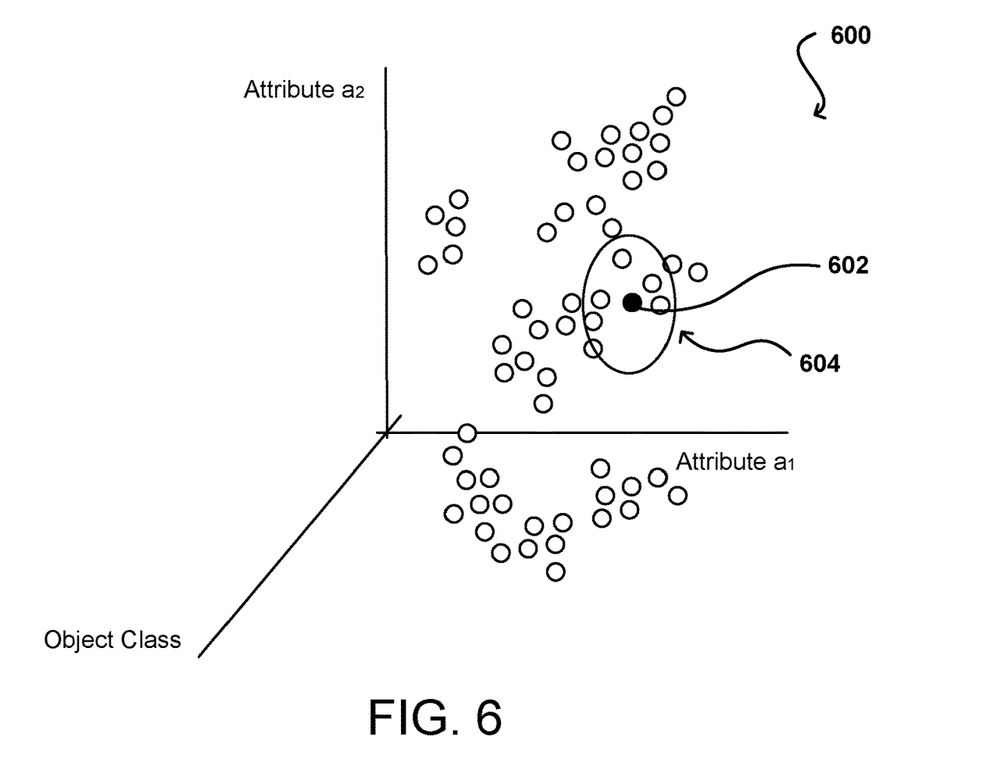
FIG. 6 illustrates an example approach to determining relevant results in a multi-dimensional semantic space that can be utilized in accordance with various embodiments.

Various steps can be performed to train and utilize neural networks or other machine learning models in accordance with various embodiments. For example, the system can be initialized by defining each potential term or word as a vector in semantic space leaned through training the neural network on an appropriate data set. In some cases multiple components can be collapsed together into a single semantic unit. The system can be optimized for various attributes or metrics, which can be used to attempt to collapse different types of elements into semantic units without losing significant amounts of pertinent information. Such an approach can be used to determine an appropriate set of semantic vectors making up the semantic space. As known for training purposes, the data used can come from a specific data set, such as for an electronic marketplace, and/or can include large public data sets, as may correspond to internet dictionaries or reference manuals, among other such options. Training on specific data sets can help to learn metrics or attributes that are particularly relevant for the provider, such as click through rates and seasonal product variations for e-commerce providers. In some embodiments the training can lock various aspects such as probability or entropy, which can help to optimize for applications such as commerce but potentially at the risk of some information being built into the model. For millions of potential inputs, there might only be hundreds or thousands of output vectors generated in the semantic representation, where a semantic representation might represent a group of similar inputs. An output semantic vector them might represent items or elements having similar attributes, features, visual features, and the like. As an example, FIG. 5 shows plots of similar terms that can be grouped into similar semantic outputs in accordance with various embodiments. Here, the training process can learn that there can be different words for the same concept not only in the same language, but in different languages. Thus, terms such as one, single, uno, un, una, and the like might be grouped to a single vector in semantic space. FIG. 6 illustrates another plot 600 of points or vector locations in semantic space. In at least some embodiments similar words or elements might correspond to points that are within a determined threshold distance of each other in the semantic space, such that these elements can be condensed into a single semantic representation. The threshold distance can vary and can be user controllable, and in at least some embodiments can vary by attribute. For example, in some embodiments there might be significant collapsing of colors where color is not of primary importance, such as where any shade of yellow or word for a yellowish color might be collapsed into a yellow semantic representation, but might allow for very little collapsing for situations where slight differences in color may be significant. As another example, in some situations "female" and "woman" may be able to be collapsed where only gender is of importance for a specific type of search, while in other situations the fact that a female may correspond to a girl, baby, or toddler may be of such significance that none of these terms may be collapsed into a single semantic representation. For a given input set certain embodiments will generate a set of semantic representations, such as one for text only, one for image data only, and one for text and image data together. Such an approach should be able to determine the same semantic vector or representation whether presented with the term "red dress" or a picture of a red dress, or a combination thereof. Other advantages of a semantic space for search include better modeling of similarly by using semantic space on the asset level, and the ability for the learned semantics to implicitly learn synonyms from large data. Normalization for diverse languages and input noise robustness can also be implicit.

An example process can be discussed with respect to FIG. 6. In this process a query is analyzed to determine the intent. The object(s) of central relevance to the intent are recognized, as well as the attributes for the object(s). The object can be the core vector of the query, referred to herein as the skeleton or backbone. These attributes can include direct attributes (such as color or size) and/or indirect attributes (such as for winter). The appropriate distance metric for the ranking can be determined based at least in part upon the determined intent, where the distance metric can be expressed in some embodiments as an objective function. The determined attributes can adjust that vector in detail, such as "light medium robin egg blue," and/or can allow for more or less variance, such as "black or some darker blue." Various other forces can be used to shape or adjust the vector, such as by adding personalization and other biases, such as may relate to the market, location, or context, etc. For example, the default object vector might specify a point 602 in semantic space, but the attributes can affect the final position by up to a maximum amount 604 based at least in part upon the relevant attributes. In at least some embodiments the query is fed to a parser that can use the trained model to determine the backbone or object of the query, the various attributes, etc. One the intent of the query is determined, that semantic representation of the query can be used to search against an index of a multi-dimensional database by determining the appropriate vector in the multi-dimensional semantic space. The search results can thus include items or objects whose vectors or points in the semantic space are proximate the vector for the semantic query.

Figure 7:
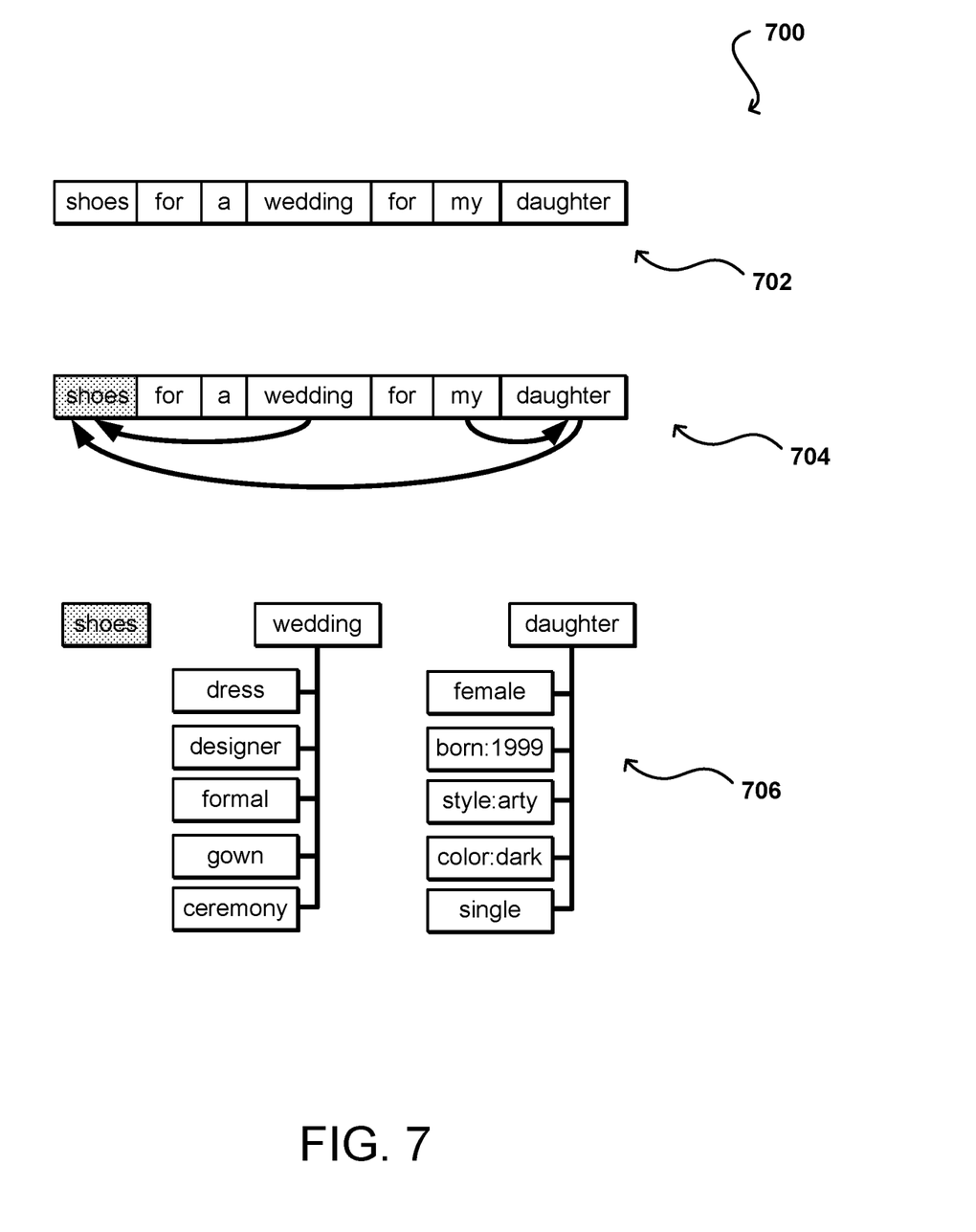
FIG. 7 illustrates an example process for identifying assets for a received query that can be utilized in accordance with various embodiments.

FIG. 7 illustrates an example parsing and/or semantic analysis 700 that can be performed on a received query in accordance with various embodiments. In this example, the query 702 "shoes for a wedding for my daughter" is received. The query can be passed through a semantic analysis component, such as a parser, to attempt to identify the key components of the query 704, such as the backbone or primary object shoes, as well as the relevant attributes. In this example, the attributes would include the word "wedding" that specifies the type of event, as well as the word "daughter" that specifies who the shoes will be for. The word "my" can also be determined to modify daughter in case information is available specifically about the user's daughter. The backbone and attributes can then be used to determine assets 706 or virtual assets that can help to determine the appropriate semantic vector for the intent. As illustrated, the primary intent or object is identified to be shoes, but this can be modified by the attributes daughter and wedding. For each of the attributes there can be additional information available that can help to determine or refine the intent. For example, the term "wedding" is associated with attributes such as "dress," "designer," "formal," "gown," and "ceremony," each of which can help to determine the type of shoes that are appropriate, or correspond to the intent of the user, by modifying the location of the semantic vector in the semantic space. Similarly, in this example information is known about the user's daughter, as relates to the gender, age, style, colors, and marital status of the daughter, which can also help to identify the potential styles that might appeal to a woman with those characteristics and can also help to adjust the location of the vector in the semantic space.

In some embodiments a reasoning and composition analysis can be performed using natural language understanding.

A general reasoning approach can be used to attempt to interpret or translate complex structures into vectors as discussed elsewhere herein. In this example the query vector can be defined as a series of asset vectors, such as may be given by:

$$Q = X_{obj} * X_{occ} * X_{user} * X_{bias} * \ldots$$

In the above formula, where Q represents the query vector, $X_{obj}$ is a virtual asset describing any aspect related to the object of relevance, as the term "shoes" can include information for all shoe categories with the relevant attributes. $X_{occ}$ is a virtual asset describing all aspects related to a certain occasion, such as where the term "wedding" includes formal dresses and shoes, specific designer brands, and the like. $X_{user}$ is a virtual asset describing all terms that can be related to a person, such as where the words "my daughter" can include information and preferences learned from past interactions, where the information can have been gathered implicitly or explicitly. $X_{bias}$ can include any outside bias information, such as may related to the location, weather, or market, which can help to determine the type of shoes appropriate for the specified event. In at least some embodiments, the primary object defines the primary vector in semantic space, then each attribute can potentially adjust the location, shape, or size of that vector in semantic space along a corresponding dimension or axis.

Based at least in part upon the primary object and determined attributes, a set of search results can be determined that are proximate the location in semantic space. It might be the case, however, that there are many results near that location or very few results near that location, or that results cannot be located with sufficient confidence, among other such options. Accordingly, it may be desirable in at least some situations to attempt to obtain additional information from the user. This can include, for example, asking for more information about the primary object in general, as may be based upon attributes known for that type of object, or by analyzing the attributes of objects near the determined location in semantic space and asking the user for clarification along those types of attributes. For example, there might be twenty pairs of shoes that potentially correspond to the semantic query, and if one or two attributes can be used to segment the pairs into smaller groups then the user can be asked one or more questions about those attributes. The answer(s) from the user can help to move the query vector along one or more corresponding attribute dimensions. For wedding shoes, this might include attributes such as heel height or number of straps, etc. If the time of year or location have not been specified, then related questions might be presented to the user to help use the temporal aspect to determine the most appropriate results for the determined intent. In some embodiments information such as the user's current location (as may be determined using GPS data) or related searches might be used as well, among other such information as available.

A dialog manager (or query refinement manager) can thus have a set of primary tasks. One such task is to make the query context aware, and another is to use natural language generation to prompt the user to provide additional information. As mentioned elsewhere herein, the prompting for additional information can be iterative in order to improve the confidence or accuracy of the determination, or at least refine the semantic understanding of the query. In order to make the query context aware, the query vector formula can be extended to:

$$Q_t = X_{obj} \cdot X_{occ} \cdot X_{user} \cdot X_{bias} \cdot \ldots \cdot Q_{t-1}$$

Here, $Q_t$ is the query at a given point in time, which can be dependent on the new information but in the context of previous queries. The natural language generation can be used to determine appropriate natural language prompts that suggest to the user to correct, refine, or otherwise adjust the query in some way. This can involve a "translation" of information in the query $Q_t$ to a sequence of words that motivates $Q_{t+1}$ to hold more specific information. In at least some embodiments the natural language generation can be rule-based, such as where there may be a limited amount of training data, and can be motivated by a refinement process. The generator can generate fixed questions if certain criteria are met, such as where a clothing item has been specified but not a size. In other embodiments questions can be generated by using machine translation techniques based upon the context or intent, among other such options. For such cases the query vector formula can become:

$$Q_t = X_{obj} \cdot X_{occ} \cdot X_{user} \cdot X_{bias} \cdot \ldots \cdot A_{t-1} \cdot Q_{t-1}$$

where $A_{t-1}$ is the last prompt towards the user. Keeping the components $X_i$ separate allows the models to be extended and revised. The models also can be replaced or hybridized with rules that maintain manual business logic. In the context of a semantic space as described before, the personalization for a query is the skew introduced by the term $X_{user}$. For marketing and/or maintenance purposes, the user base can be clustered according to general commonalities, such as to classify "static" trends. Using the terms $X_{occ}$, $X_{user}$ and $X_{bias}$ in combination might expose and help identify trends depending on other specific factors, such as the need to to identify trends for specific locations, customer types, age groups, events, seasonality, or combinations thereof.

The relationships between items along various attributes can be learned, in at least some embodiments, using various machine learning approaches. For example, deep neural networks can be trained using a set of training data that can then be applied to the various content of a category or type of item. In other embodiments, generative adversarial networks (GANs) can be used that do not require the seeding used for training deep neural networks. Various other approaches can be used as well as discussed and suggested elsewhere herein. Deep neural networks, or deep learning, can involve representing images or other content items as vectors or sets of edges or regions to simplify the learning task. These processes can allow for unsupervised learning and hierarchical feature extraction, among other such options. Deep learning algorithms can transform these inputs through multiple layers of transformation to describe causal connections between input and output. GANs can estimate a general model of such inputs using an adversarial process, as may utilize a generative model and a discriminative model. The discriminative model discriminates between different classes of data, such as a convolutional neural network trained to provide different outputs for different recognized classes. The generative model generates new data that fits the distribution of the training data. The generative model can be, for example, a Gaussian mixture model that can generate a set of points which approximately fit the training data. Various other networks or trained models can be used as well within the scope of the various embodiments. For approaches that require seeding, there can be a set of training data defined or otherwise generated for each attribute applied for a given category. The attributes can be defined by an administrator or other authorized entity, or can be learned algorithmically based on user queries, among other such options.

Figure 8:
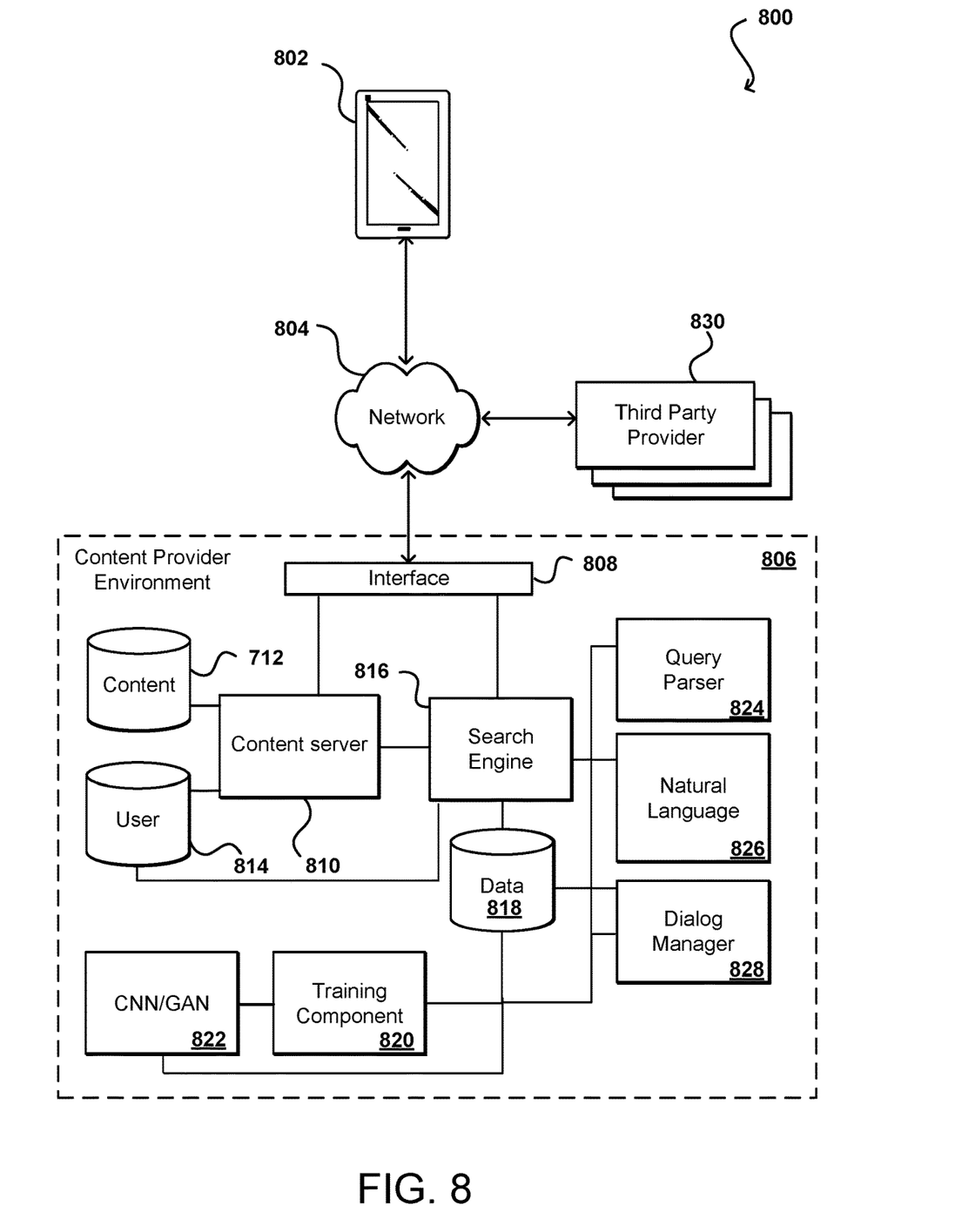
FIG. 8 illustrates an example system that can be used to implement aspects of the various embodiments.

FIG. 8 illustrates an example environment 800 in which aspects of the various embodiments can be implemented. In this example, a computing device 802 is able to make a call or request across one or more networks 804 to a content provider environment 806. The network(s) can include any appropriate network, such as the Internet, a local area network (LAN), a cellular network, an Ethernet, or other such wired and/or wireless network. The content provider environment 806 can include any appropriate resources for providing content from a resource provider, as may include various servers, data stores, and other such components known or used for providing content from across a network (or from the "cloud").

In this example, a request received to the content provider environment 806 can be received by an interface layer 808 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 810 and/or content servers, which can obtain the content from a content data store 814 or other such repository to be sent back across the network(s) to the computing device. In some embodiments, information for the request might also be compared against user data in a user data store 812 or other such location do determine, for example, whether the user has access rights to that content. In some embodiments user data might also be analyzed to determine which type of content to provide, additional supplemental content to provide with the primary content, and the like.

In some instances a user might refine the query based upon one or more prompts from a dialog manager 828. In at least some embodiments a dialog manager can work with a natural language module 826 to determine appropriate questions to ask the user in order to refine the query. The search engine 816 can work with a query component or parser 824 to determine, among other things, the starting points for the query and/or refined query. As mentioned, the parser 824 can work with the natural language module 826 to determine the primary object, intent, attributes, and other such aspects of the query. For a refined query, the query can be based upon a prior query or prior results and the vectors for the individual attributes adjusted accordingly. As mentioned, in some embodiments the request might specify amounts or magnitudes for the various attributes, which can be set in some embodiments using a weighting component or other such mechanism. The information can be fed back to the search engine 816 which in this example includes the refinement logic to perform the lookup against the data in the data store 818 in order to determine the refined results.

The individual attribute vectors can be determined at least in part using neural networks 822 such as a CNN or GAN to determine the appropriate vectors through training on an appropriate data set. The training component 820 can perform the training on the models and provide the resulting results and/or trained models for use in determining the individual attribute vectors. In order to determine attributes for various content items, in at least some embodiments, some analysis of content items in an electronic catalog or other data repository is performed to determine information about the characteristics or attributes of the items. In some embodiments, one or more feature descriptors or vectors can be generated to describe various attributes of an image (such as brightness, formalness, etc.).

In the example shown in FIG. 8, a neural network 822 such as a convolutional neural network (CNN) or generative adversarial network (GAN) can be trained using, for example, descriptions and/or images of objects. As mentioned, for CNN-based approaches there can be text and images submitted that are classified by at least one type of attribute, while for GAN-based approaches information may be submitted for training that may include metadata or other information useful in classifying one or more aspects of each image. For example, a CNN may be trained to perform object recognition using images of different types of objects, then learn how the attributes relate to those objects using the provided training data. In certain embodiments, training a neural network may involve significant use of computation resources and time, such that this may correspond to a preparatory step to servicing search requests and/or performed relatively infrequently with respect to search request servicing and/or according to a schedule. An example process for training a neural network for generating descriptors describing visual features of an image in a collection of images begins with building a set of training images. In accordance with various embodiments, each image (or pair of images) in the set of training images can be associated with an object label describing an object depicted in the image or a subject represented in the image. According to some embodiments, training images and respective training object labels can be located in a data store 818 that includes images of a number of different objects.

A training component 820 can utilize the training data set to train the neural network 822. As further described, neural networks can include several learning layers in their architecture. A query from the training data set is analyzed using the neural network to extract a feature vector from the network before the classification layer. This feature vector describes the subject and/or objects represented. This process can be implemented for each object in the data set, and the resulting feature vectors can be stored in a data store. In various embodiments, the resulting object feature vectors can be compressed for improved processing. For example, the object feature vectors generated by the neural network may include object feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

Figure 9:
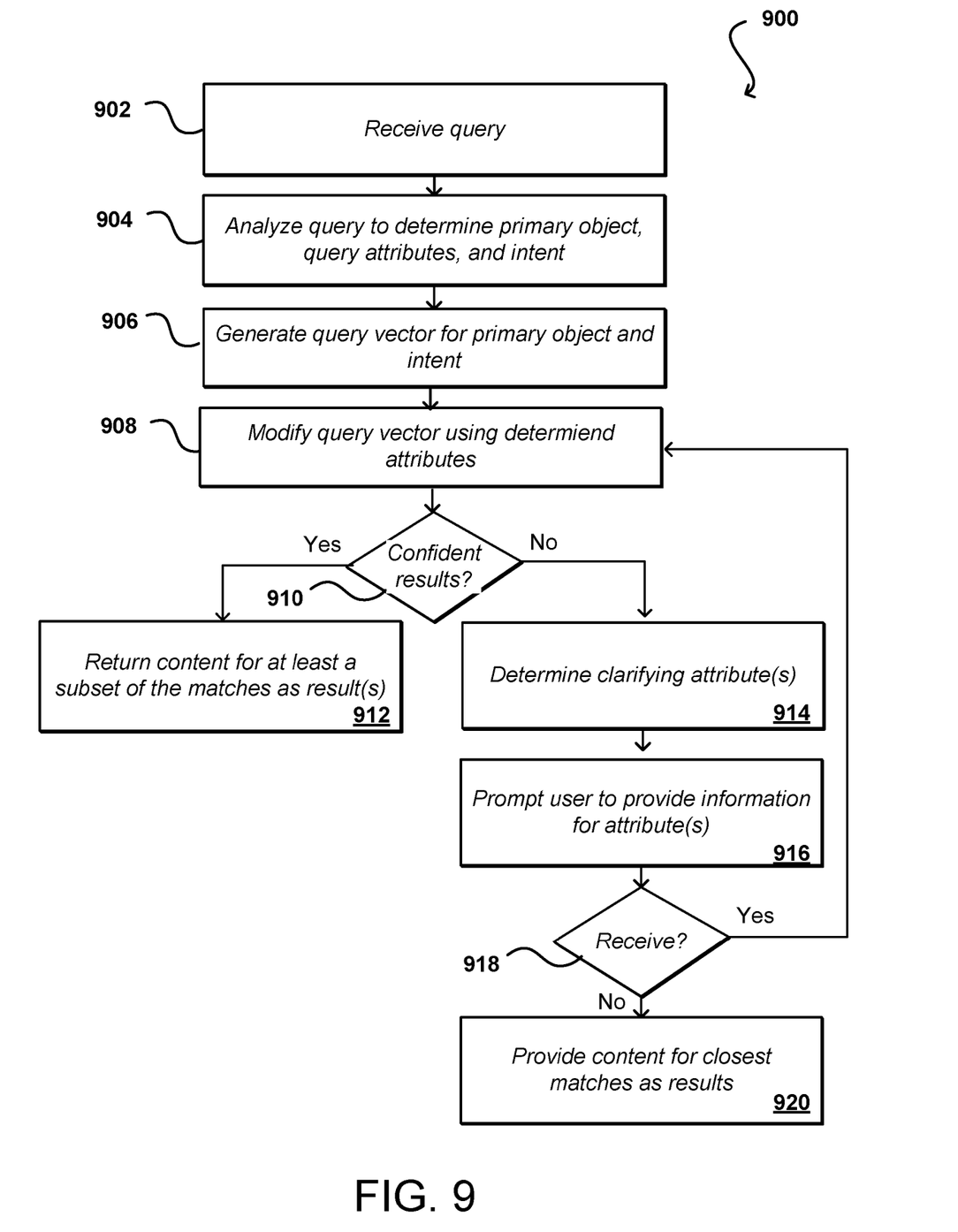
FIG. 9 illustrates an example process for determining search results that can be utilized in accordance with various embodiments.

FIG. 9 illustrates an example process 900 for that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a search query is received 902 that may include one or more keywords, images, or other such information received from a user to an interface of a computing device. Other types or requests for content may be received as well, as may relate to content navigation or other such activities. In this example the query is analyzed 904 using semantic analysis to determine aspects of the query, such as an intent, a primary object (or backbone), and one or more query attributes, among other such aspects. As mentioned, there can be temporal or other attributes included with the query or otherwise associated with the query. As mentioned elsewhere herein, the temporal aspect can relate to the object of the query, an attribute of the query, or a submitting user, among other such options. In this example a query vector can be generated 906 that corresponds go the primary object and the intent. For implementations such as an electronic marketplace the intent might be to locate and/or obtain products, such that the focus might be on determining the item or object of interest. This query vector can be mapped in semantic space in order to determine a location associated with the semantic query. The query vector can be modified 908 using the determined query attributes, which for each attribute can cause and endpoint of the vector to move along an axis or dimension associated with that attribute. A determination can be made 910 as to whether a sufficient number of results have been determined for the query that at least meet a minimum confidence threshold or other such criterion. If so, content or information for at least a subset of the matches can be returned 912 as results for the query. If less than a sufficient number of results have been identified with sufficient confidence, or if no such results have been identified, then one or more clarifying attributes can be determined 914, as may be based upon the type of object or intent, attributes of potential results, or other such information. The user can then be prompted 916 to provide the appropriate information or values for at least some of the clarifying attributes. As mentioned, a dialog manager and natural language generator can be used to provide the prompts in at least some embodiments. A determination can be made 918 as to whether any clarifying information is received, and if not then content for the closest potential matches can be provided as search results for the query. If clarifying information is received then the additional attribute information can be used to adjust the semantic vector in multi-dimensional semantic space and the refinement can continue. As mentioned, there may be temporal attributes and in at least some embodiments this can impact the records, indexes, or other information used to identify the results.

Figure 10:
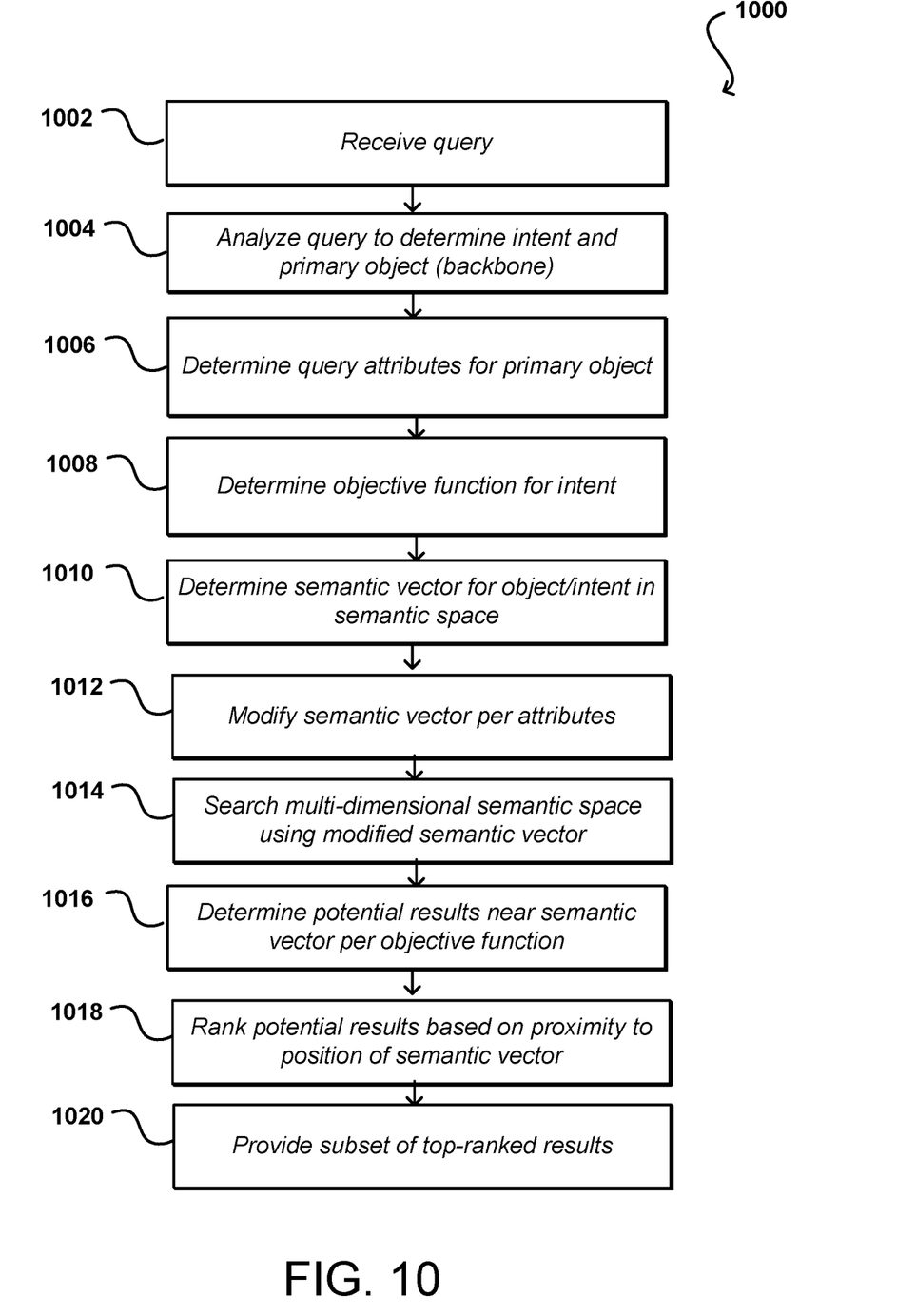
FIG. 10 illustrates an example process for determining search results based on a semantic analysis of a query that can be utilized in accordance with various embodiments.

FIG. 10 illustrates an example process 1000 for determining content based on semantic analysis that can be utilized in accordance with various embodiments. In this example, a query or other navigational request is received 1002, as discussed with respect to the process of FIG. 9 and elsewhere herein. The query can be analyzed 1004 to determine the intent and primary object or backbone of the query. The query attributes can be determined 1006, as well as an objective function for the intent 1008. A semantic vector can be determined 1010 in multi-dimensional semantic space that corresponds to the primary object and intent, and that semantic vector can be modified 1012 using the determined attributes (as well as any additionally provided, obtained, or determined attributes). The learned multi-dimensional semantic space can be searched 1014 using the modified semantic vector, and potential results near an endpoint of the semantic vector (i.e., with a determined distance between the semantic vector and the respective reference vector(s)) determined 1016 per the objective function, which can be used in some embodiments to determine a maximum distance from the vector endpoint in semantic space for which potential matches can be identified. The potential results can be ranked 1018 based at least in part upon their proximity to the position of the semantic vector in semantic space. At least a subset of the top or highest-ranked results can then be provided as search results for the received query.

Figure 11:
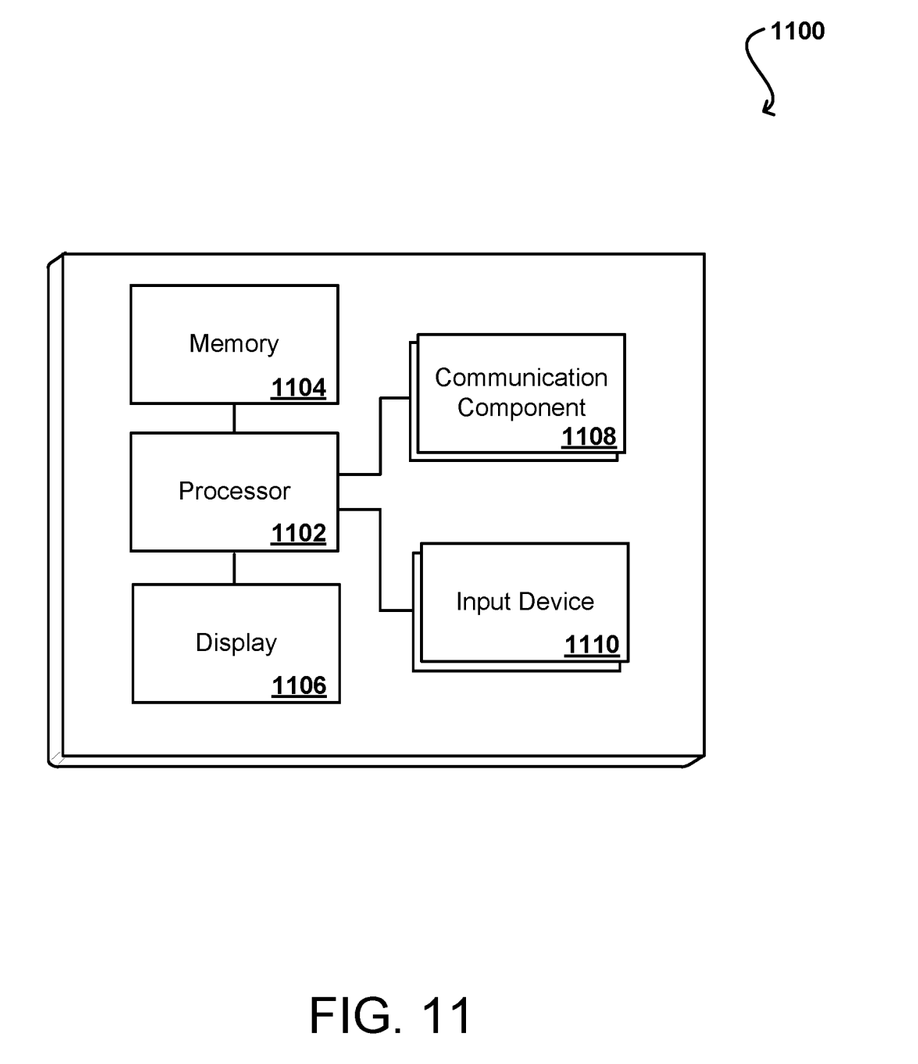
FIG. 11 illustrates example components of a computing device that can be utilized in accordance with various embodiments.

FIG. 11 illustrates a logical arrangement of a set of general components of an example computing device 1100 that can be used to implement aspects of the various embodiments. In this example, the device includes a processor 1102 for executing instructions that can be stored in a memory device or element 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1106, such as a touch screen or liquid crystal display (LCD), although devices such as portable media players might convey information via other means, such as through audio speakers. As discussed, the device in many embodiments will include at least one input element 1108 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1100 of FIG. 11 can include one or more network interface elements 1108 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a search query including a plurality of keywords;
analyzing the search query using semantic analysis to identify an intent of the search query, the semantic analysis further identifying a primary object and at least one attribute corresponding to the primary object;
generating a semantic vector corresponding to the intent and the primary object;
generating an adjusted semantic vector based at least in part on the at least one attribute corresponding to the primary object and a temporal aspect associated with the search query;
performing a lookup by projecting the adjusted semantic vector in a multi-dimensional semantic space, the multi-dimensional semantic space including vector representations of a plurality of products offered for consumption through an electronic marketplace, the vector representations learned through training of a neural network using at least a catalog of product data for the electronic marketplace, at least a subset of dimensions of the multi-dimensional semantic space corresponding to attributes learned for the plurality of products;
identifying a set of the products with vector representations proximate the adjusted semantic vector in the multi-dimensional semantic space;
returning, as search results, information for at least a subset of the set of the products;
determining that the identified set of products fails to satisfy at least one selection criterion, based on a determination that less than a predetermined number of results have been identified within a confidence threshold;
in response to the determination that the identified set of products fails to satisfy the at least one selection criterion:
prompting a user to provide additional information for the at least one attribute;
adjusting the adjusted semantic vector according to the additional information; and
determining a second subset of the set of products based at least in part upon the adjusted semantic vector after the adjusting of the adjusted semantic vector.

2. The computer-implemented method of claim 1, further comprising:
determining the at least one attribute based upon a plurality of attributes corresponding to the set of products with representations proximate the adjusted semantic vector.

3. The computer-implemented method of claim 1, further comprising:
training the neural network using three sets of input data, the three sets of input data including a first set with only text data, a second set with only image data, and a third set with both text and image data; and
generating the vector representations for the plurality of products in the semantic space using the trained neural network.

4. The computer-implemented method of claim 1, further comprising:
determining a respective distance in the semantic space between an endpoint of the adjusted semantic vector and the respective endpoints of the vector representations for the set of products;
ranking the set of products based at least in part upon the respective distance; and
selecting the subset of the set of products based at least in part upon the ranking.

5. A computer-implemented method, comprising:
receiving a query;
determining an object and a temporal component of the query;
generating a semantic vector corresponding to both the object and the temporal component of the query, the semantic vector being language agnostic;
projecting the semantic vector in a multi-dimensional semantic space, the multi-dimensional semantic space including vector representations of a plurality of items as learned through training of at least one neural network;
returning information for a subset of the items based upon a proximity of the vector representations for the subset of items to an endpoint of the semantic vector;
determining that the plurality of items fails to satisfy at least one selection criterion, based on a determination that less than a predetermined number of results have been identified within a confidence threshold;
in response to the determination that the plurality of items fails to satisfy the at least one selection criterion:
prompting an input for additional information for the semantic vector;
adjusting the semantic vector according to the additional information; and
determining a second subset of the items based at least in part upon the semantic vector after the adjusting.

6. The computer-implemented method of claim 5, further comprising:
determining at least one attribute for the for the object of the query; and
generating the semantic vector based further in part upon the at least one attribute.

7. The computer-implemented method of claim 5, wherein the
attribute is received with the query or a subsequent transmission, and further comprising:
iteratively requesting additional attribute information to refine the semantic vector.

8. The computer-implemented method of claim 5, further comprising:
training the at least one neural network using at least one of text data or image data from a repository of item information, wherein the query is able to contain at least one of an image or a keyword;
analyzing the information to determine concepts having similar semantic meaning; and
grouping the concepts into a set of semantic units of the similar semantic meaning, wherein the semantic space includes vector representations corresponding to the set of semantic units.

9. The computer-implemented method of claim 5, further comprising:
determining a subset of the items having a temporal component; and
generating a set of vector representations for the subset based at least in part upon the temporal component.

10. The computer-implemented method of claim 5, wherein the
plurality of items correspond to products offered for consumption through an electronic marketplace, and wherein the information for the items includes historical performance data for the items.

11. The computer-implemented method of claim 5, further comprising:
analyzing the query using semantic analysis to further determine an intent of the query with respect to the at least one object, wherein the semantic vector is generated further based upon the intent, and wherein the intent is explicitly identified in the query or implicit based at least in part upon a content of the query.

12. The computer-implemented method of claim 11, further
comprising:
determining an objective function corresponding to the intent, wherein at least one selection criterion for determining the subset of the items determines a distance threshold for the proximity of the vector representations for the subset of items to an endpoint of the semantic vector.

13. The computer-implemented method of claim 6, further
comprising:
determining the at least one attribute based upon a plurality of attributes corresponding to the plurality of the items with representations proximate the modified semantic vector.

14. The computer-implemented method of claim 5, further
comprising:
determining a respective distance in the semantic space between an endpoint of the semantic vector and respective endpoints of the vector representations for the plurality of items;
ranking the set of items based at least in part upon the respective distances; and
selecting the subset of items based at least in part upon the ranking.

15. A system, comprising:
at least one processor; and
memory storing instructions that, when executed by the at least one processor, cause the system to:
receive a query;
determine an object and a temporal component of the query;
generate a semantic vector corresponding to both the object and the temporal component of the query, the semantic vector being language agnostic;
project the semantic vector in a multi-dimensional semantic space, the multi-dimensional semantic space including vector representations of a plurality of items as learned through training of at least one neural network;
return information for a subset of the items based upon a proximity of the vector representations for the subset of items to an endpoint of the semantic vector;
determine that the plurality of items fails to satisfy at least one selection criterion, based on a determination that less than a predetermined number of results have been identified within a confidence threshold;
in response to the determination that the plurality of items fails to satisfy the at least one selection criterion:
prompt an input for additional information for the semantic vector;
adjust the semantic vector according to the additional information; and
determine a second subset of the items based at least in part upon the semantic vector after the adjusting.

16. The system of claim 15, wherein the instructions when executed
further cause the system to:
train the at least one neural network using at least one of text data or image data from a repository of item information;
analyze the information to determine concepts having similar semantic meaning; and
group the concepts into a set of semantic units of the similar semantic meaning, wherein the semantic space includes vector representations corresponding to the set of semantic units.

17. The system of claim 15, wherein the instructions when executed
further cause the system to:
analyze the query using semantic analysis to further determine an intent of the query with respect to the at least one object, wherein the semantic vector is generated further based upon the intent; and
determine an objective function corresponding to the intent, wherein at least one selection criterion for determining the subset of the items determines a distance threshold for the proximity of the vector representations for the subset of items to an endpoint of the semantic vector.

* * * * *